US010931212B2

(12) United States Patent
McElveen, Jr. et al.

(10) Patent No.: US 10,931,212 B2
(45) Date of Patent: Feb. 23, 2021

(54) MOTOR STARTER FOR SYNCHRONOUS MACHINE

(71) Applicant: ABB Schweiz AG, Baden (CH)

(72) Inventors: Robert F. McElveen, Jr., Anderson, SC (US); Jukka Jarvinen, Greenville, SC (US)

(73) Assignee: ABB Schweiz AG, Baden (CH)

( * ) Notice: Subject to any disclaimer, the term of this patent is extended or adjusted under 35 U.S.C. 154(b) by 396 days.

(21) Appl. No.: 16/121,130

(22) Filed: Sep. 4, 2018

(65) Prior Publication Data

US 2020/0076333 A1    Mar. 5, 2020

(51) Int. Cl.
*H02P 1/02* (2006.01)
*F04D 25/06* (2006.01)
*H02P 25/18* (2006.01)

(52) U.S. Cl.
CPC .............. *H02P 1/028* (2013.01); *F04D 25/06* (2013.01); *H02P 25/184* (2013.01)

(58) Field of Classification Search
CPC .......... H02P 1/32; H02P 25/184; H02P 1/028; H01H 50/002; H02K 3/522; H02K 7/145; F04D 25/06
See application file for complete search history.

(56) References Cited

U.S. PATENT DOCUMENTS

| 5,142,213 | A | 8/1992 | Stelter |
| 9,746,521 | B2 | 8/2017 | Bock et al. |
| 2011/0006720 | A1 | 1/2011 | Neiman |
| 2016/0134210 | A1* | 5/2016 | Bock .................... H01H 50/323 318/739 |

(Continued)

FOREIGN PATENT DOCUMENTS

| GB | 2549146 | 10/2017 |
| JP | H0433591 | 2/1992 |

(Continued)

OTHER PUBLICATIONS

ABB, RPM XE eXtreme Efficient Motors, available at https://www.baldor.com/brands/baldor-reliance/products/motors/ac-motors/severe-duty/rpm-xe-extreme-efficient-motors, last accessed Aug. 31, 2018, 12 pages.

Nema, "Tests and Performance—AC Motors," Motors and Generators, Nema Standards Publication MG 1-2016, dated 2016, Sec. 2, Part 12, p. 28, National Electrical Manufacturers Association, Rosslyn, USA.

(Continued)

*Primary Examiner* — Zoheb S Imtiaz
(74) *Attorney, Agent, or Firm* — Taft Stettinius & Hollister LLP

(57) ABSTRACT

Unique systems, methods, techniques and apparatuses of motor starters are disclosed. One exemplary embodiment is a synchronous machine including a plurality of stator phase windings, a rotor, a motor starter, and a controller. The motor starter includes a plurality of wye semiconductor switches and a plurality of delta semiconductor switches. The controller is structured to operate the plurality of wye semiconductor switches and the plurality of delta semiconductor switches so as to couple the plurality of stator phase windings in a delta configuration while an angular speed of the rotor is less than a synchronous speed, and structured to operate the plurality of wye semiconductor switches and the plurality of delta semiconductor switches so as to couple the plurality of stator phase windings in a wye configuration in response to the angular speed of the rotor being equal to the synchronous speed.

21 Claims, 4 Drawing Sheets

(56) References Cited

U.S. PATENT DOCUMENTS

2017/0033720 A1* 2/2017 Zeyn .................... H02P 25/184
2018/0283340 A1* 10/2018 Matsuyama ............ F02N 11/04

FOREIGN PATENT DOCUMENTS

JP    2018057114    4/2018
WO    2017041144    3/2017

OTHER PUBLICATIONS

Nema, "Large Motors—Alternating-Current Permanent Magnet Motors," Guide to General-Purpose Synchronous Motors without Excited Rotor Windings, NEMA Standards Publication SM 1-2017, dated 2017, Sec. 3, Part 9, pp. 7-8, National Electrical Manufacturers Association, Rosslyn, USA.

Mcelveen, Robert et al. "Eplacing Induction Motors with Caged Rotor Permanent Magnet Motors: Application Consideration & Cost Analysis", 2017 Petroleum and Chemical Industry, Sep. 18, 2017, pp. 435-442.

* cited by examiner

MOTOR STARTER FOR SYNCHRONOUS MACHINE

BACKGROUND

The present disclosure relates generally to motor starters. A synchronous machine undergoes a startup operation to reach synchronous speed. For a synchronous machine directly connected to utility grid, the synchronous speed of the synchronous machine is based on the frequency of the power from the grid and the pole count of the rotor and stator. During startup operation, inrush current magnitudes tend to spike. Where the synchronous machine is connected to the power source without an intervening variable frequency drive, a motor starter is often used to limit inrush current.

Synchronous machines may be used to rotate loads with a high rotary inertia, such as fans centrifuges, or conveyors. Certain synchronous machines are unable to operate at synchronous speed with a high rotary inertia load that is rotatable by an equally rated induction motor. This deficiency is due to an inability to bring a high rotary inertia load to synchronous speed with conventional motor starters. For example, FIG. 8A depicts a graph 800 illustrating startup operation using a conventional direct-on-line starter for a synchronous motor coupled to a fan with an inertia of 16 lb-ft$^2$. Graph 800 includes a line 801 representing angular speed. As the conventional direct-on-line motor starter begins to operate the synchronous motor, angular speed increases but stops short of synchronous speed 803, instead oscillating around approximately 1600 rpm. The conventional motor starter is unable to produce adequate torque to pull the motor into synchronous operation.

Existing motor startup operations suffer from a number of shortcomings and disadvantages. There remain unmet needs including reducing hardware complexity and reducing machine power losses. For instance, synchronous machines rotating a high rotary inertia load require costly variable frequency drives that generate switching power losses during of operation. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for a motor starter. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
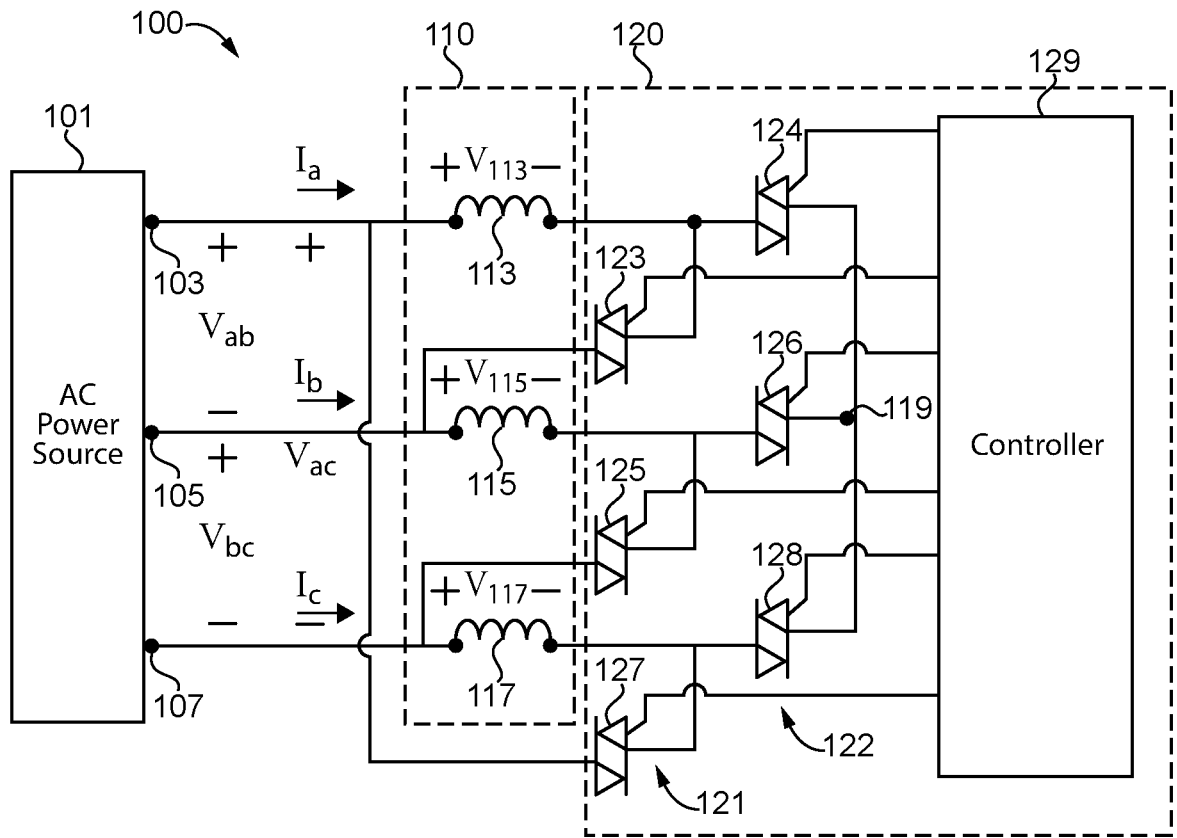
FIG. 1 is a circuit diagram of an exemplary synchronous machine startup system.

With reference to FIG. 1 there is illustrated an exemplary synchronous machine startup system 100 including motor starter 120. System 100 is structured to operate at synchronous speed while coupled to a high rotary inertia load. In certain embodiments, high rotary inertia is defined by the critical inertia values for induction machines in the NEMA MG-1 standard. In certain embodiments, high rotary inertia is one tenth of the critical inertia values of the NEMA MG-1 standard. It shall be appreciated that synchronous machine startup system 100, sometimes referred to as system 100, may be implemented in a variety of high rotary inertia load applications, including fans, fan walls, centrifuges, or conveyors to name but a few examples. Furthermore, the illustrated embodiments are not intended to in any way limit the application of exemplary motor starter 120 to a subset of synchronous machines or AC power sources based on the electrical or mechanical characteristics illustrated and described herein. For example, exemplary motor starter 120 may be incorporated into synchronous machine systems having any line-to-line voltage of power from AC power source, any number of AC power phases or stator phase windings greater two, any synchronous machine electric power rating, and any synchronous machine horsepower rating, to name but a few examples.

System 100 includes an AC power source 101 coupled to a synchronous machine 110. AC power source 101 may include a power distribution network, such as a utility grid, or a power generation system, to name but a few examples. AC power source 101 transmits three-phase AC power having a line frequency from output terminals 103, 105, and 107 to synchronous machine 110. The line frequency of the AC power transmitted by AC power source 101 may be within a range between 45 Hz and 65 Hz. System 100 is a direct-on-line system, meaning synchronous machine 110 receives AC power from AC power source 101 that is unmodified by an intervening variable frequency drive. The AC power transmitted by AC power source 101 includes electrical characteristics such as line-to-line voltages $V_{ab}$ across terminals 103 and 105, $V_{bc}$ across terminals 105 and 107, and $V_{ac}$ across terminals 103 and 107. The AC power also includes electrical characteristics such as phase current $I_a$ flowing from terminal 103, current $I_b$ flowing from terminal 105, and current $I_c$ flowing from terminal 107. In other embodiments, system 100 includes an AC power source 101 structured to transmit AC power having two or more phases and synchronous machine 110 includes a number of stator phase windings equal to the number of phases.

Synchronous machine 110 includes stator phase windings 113, 115, and 117. Each stator phase winding includes a first terminal and a second terminal. The first terminal of each of the stator phase windings is coupled to AC power source 101 and the second terminal of each stator phase winding is selectively coupled to a common node 119. The first terminal of winding 113 is coupled to output terminal 103. The first terminal of winding 115 is coupled to output terminal 105. The first terminal of winding 117 is coupled to output terminal 107. The voltages across windings 113, 115, and 117 are represented by voltages $V_{113}$, $V_{115}$, and $V_{117}$, respectively.

Motor starter 120 includes a plurality of delta semiconductor switches 121 and a plurality of wye semiconductor switches 122 coupled to controller 129 and structured to receive control signals from controller 129 effective to selectively open and close each switch. Controller 129 is structured to arrange stator phase windings 113, 115, and 117 in a delta configuration during startup operation and a wye configuration during steady state operation. In certain embodiments, startup operation includes a first time period where stator phase windings 113, 115, and 117 are arranged in a wye configuration followed by a second time period wherein stator phase windings 113, 115, and 117 are arranged in a delta configuration.

The plurality of delta semiconductor switches 121 includes semiconductor switches 123, 125, and 127. Semiconductor switch 123 is coupled between the second terminal of stator phase winding 113 and the first terminal of stator phase winding 115. Semiconductor switch 125 is coupled between the second terminal of stator phase winding 115 and the first terminal of stator phase winding 117. Semiconductor switch 127 is coupled between the second terminal of stator phase winding 117 and first terminal of stator phase winding 113.

The plurality of wye semiconductor switches 122 includes semiconductor switches 124, 126, and 128. Semiconductor switch 124 is coupled between the second terminal of winding 113 and a common node 119. Semiconductor switch 126 is coupled between the second terminal of winding 115 and a common node 119. Semiconductor switch 128 is coupled between the second terminal of winding 117 and the common node 119. In certain embodiments, the plurality of wye semiconductor switches 122 only includes two of switches 124, 126, and 128.

In certain embodiments, system 100 includes a bypass circuit including a plurality of bypass switches coupled between each stator phase winding and AC power source 101 effective to bypass the plurality of delta semiconductor switches 121 and the plurality of wye semiconductor switches 122. When the plurality of delta semiconductor switches 121 and the plurality of wye semiconductor switches 122 are opened and the bypass switches are closed, stator phase windings 113, 115, and 117 are arranged in a wye configuration.

Controller 129 is structured to control the arrangement of stator phase windings of synchronous machine 110 in a wye configuration by toggling the switches of the plurality of wye semiconductor switches 122 while opening the switches of the plurality of delta semiconductor switches 121. Controller 129 is structured to arrange the stator phase windings of synchronous machine 110 in a delta configuration by opening the switches of the plurality of wye semiconductor switches 122 and toggling the switches of the plurality of delta semiconductor switches 121. Determining whether to arrange stator phase windings 113, 115, and 117 in a wye configuration or a delta configuration is determined by controller 129 using current measurements. The current measurements received by controller 129 correspond to machine conditions that indicate to controller 129 that stator phase windings must be arranged in a delta configuration in order to generate sufficient pull-in torque during startup operation to reach synchronous speed. The toggling of the switches by controller 129 is determined by electrical characteristics of machine 110 such as current thresholds based on current ratings of synchronous machine 110. Timing of the switch toggling may correspond to a determined firing angle necessary to maintain currents $I_a$, $I_b$, and $I_c$ at or below a current threshold. Each switch of motor starter 120 is structured to be opened and closed in a substantially zero-current condition, such as less than 5% of nominal current magnitude.

In the illustrated embodiments, each of the semiconductor switches of motor starter 120 is a bidirectional triode thyristor (TRIAC). In other embodiments, one or more of the semiconductor switches of motor starter 120 may instead include one or more thyristors, insulated-gate bipolar transistors (IGBTs), bipolar junction transistors (BJTs), metal-oxide-semiconductor field-effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of semiconductor switch structured to selectively control the flow of electric current. A semiconductor switch of motor starter 120 may include two semiconductor switches coupled in an anti-parallel configuration, such as two thyristors. It shall be appreciated that any or all of the foregoing features of system 100 may also be present in the other synchronous machine systems disclosed herein.

Figure 2:
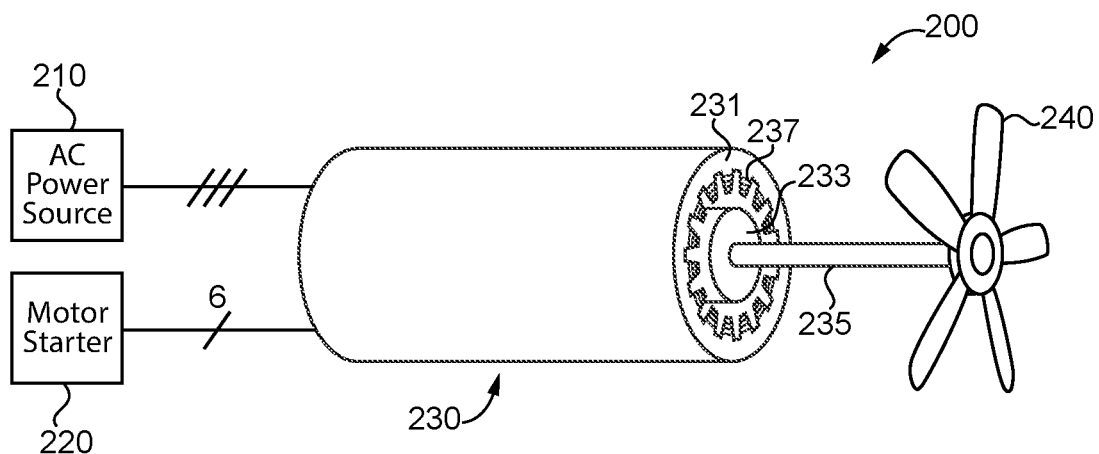
FIG. 2 is an exemplary synchronous machine.

With reference to FIG. 2 there is illustrated an exemplary synchronous machine system 200 structured to exert a rotational force on a load 240. System 200 includes an AC power source 210, a motor starter 220, and a synchronous machine 230.

Synchronous machine 230 includes a stator 231 and a rotor 233. Stator 231 includes a plurality of stator phase windings 237, wound around a plurality of stator teeth. The plurality of stator phase windings 237 is coupled to AC power source 210 and structured to receive AC power from AC power source 210 and is selectively arranged by motor starter 220 in either a delta configuration or a wye configuration. AC power source 210 is directly coupled to stator 231 in that system 200 does not include a variable frequency drive to modify the voltage and fundamental, or line, frequency of the AC power provided to stator 231. Other components, such as circuit breakers, relays, or filters may be operatively coupled between the directly coupled AC power source 210 and stator 231.

Rotor 233 is coupled to load 240 by way of a shaft 235. In certain embodiments, rotor 233 is coupled to load 240 by way of a gearbox or a belt arrangement. In other embodiments, rotor 233 is directly coupled to load 240.

Stator 231 is structured to exert an electromagnetic force on rotor 233 causing rotational movement of rotor 233, shaft 235, and load 240. During steady state operation of machine 230, rotor 233 rotates at synchronous speed. The rotational speed of rotor 233 at synchronous speed is equal to the frequency of the AC power received from AC power source 210 multiplied by 120 and divided by the number of poles of rotor 233. For example, a synchronous machine with a four-pole rotor receiving AC power with a frequency of 60 Hz has a synchronous speed of 1800 revolutions per minute (rpm). In certain embodiments, rotor 233 is a caged rotor permanent magnet, also known as caged permanent magnet rotor, comprising a squirrel cage and a plurality of permanent magnets. In certain embodiments, machine 230 is a line start synchronous reluctance motor and rotor 233 is a line start synchronous reluctance rotor. The rotor may include a plurality of flux barriers and may include a plurality of permanent magnets inserted into rotor cavities. In certain embodiments, rotor 233 includes a field winding instead of a plurality of permanent magnets.

During startup operation, motor starter 220 operates to increase the angular speed of rotor 233 from a lesser speed to synchronous speed while maintaining motor current levels at or below a maximum current threshold. Synchronous machine 230 may start from a standstill, but machine 230 may also begin the startup operation while rotor 233 is rotating, such as following a recent power failure or an incomplete machine shutdown operation.

Load 240 is a fan or another type of load with a high rotary inertia. As the rotary inertia of load 240 increases, the amount of pull-in torque required by synchronous machine 230 to reach synchronous speed also increases. An induction motor requires significantly less torque to complete motor startup with the same load. Due to the differences in motor design, a synchronous machine with a conventional motor starter may only be able to synchronize with a load having a rotary inertia less than half of a load that can be operated with an induction motor of the same power rating. As explained by the following figures, the illustrated motor starter increases the synchronization capability of synchronous machine 230 by as much as five times. In other embodiments, an exemplary motor starter may increase the synchronization capability of a synchronous machine by more than five times.

With reference to FIGS. 3-7 there are graphs illustrating operation of synchronous machine startup system 100 in FIG. 1, machine 110 being a 50 HP synchronous machine coupled to a load with a load inertia of 232 lb-ft² and having a synchronous speed of 1800 rpm. It is important to note the load inertia of 232 lb-ft² is the critical inertia value defined by NEMA MG-1 for a 50 HP induction motor.

At time $t_0$, startup operation of synchronous machine 110 commences as motor starter 120 arranges stator phase windings 113, 115, and 117 in a wye configuration and AC power source 101 begins to provide power to synchronous machine 110. At time $t_1$, motor starter 120 transitions stator phase windings 113, 115, and 117 from a wye configuration to a delta configuration. At time $t_2$, motor starter 120 enters steady state operation by transitioning stator phase windings 113, 115, and 117 from a delta configuration to a wye configuration. It shall be appreciated that the electrical characteristics of winding 113 have been illustrated since the other windings follow the same pattern as the illustrated phase. In other embodiments, the stator phase windings of synchronous machine 110 are only arranged in a delta configuration during startup operation. In certain embodiments, motor starter 120 includes a bypass switches and motor starter 120 arranges the stator phase windings in a wye configuration at time $t_2$ by opening the plurality of delta semiconductor switches 121 and the plurality of wye semiconductor switches 122 while closing the bypass switches. The bypass switches are each coupled between a common node and a respective one of the plurality of stator phase windings.

Figure 3:
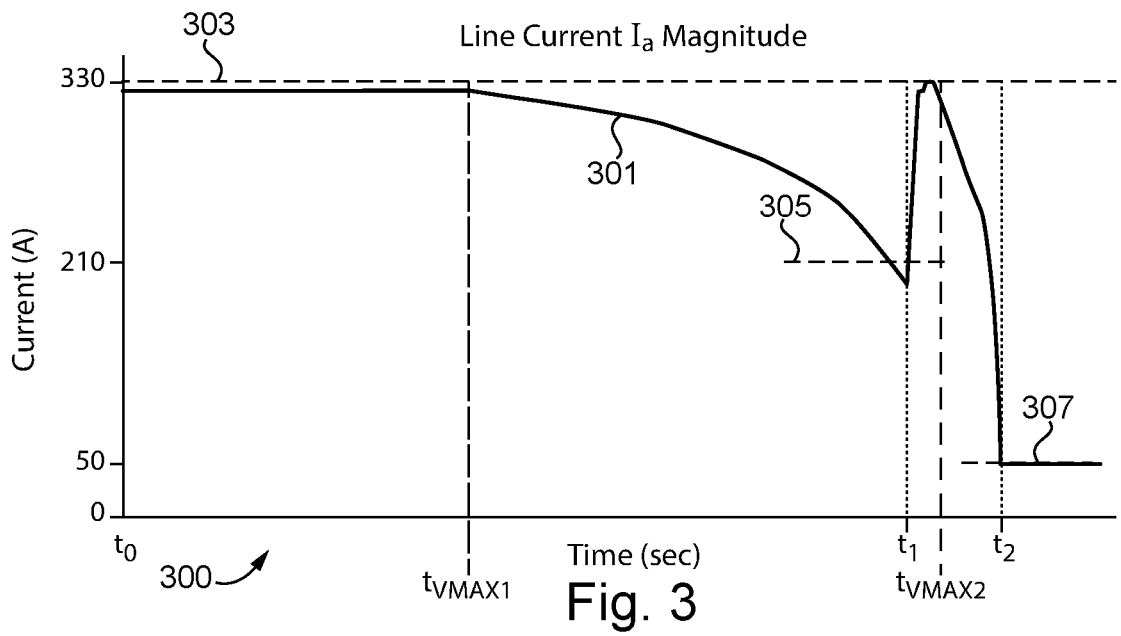
FIGS. 3-7 are graphs illustrating startup operation of the exemplary synchronous machine startup system of FIG. 1.

With reference to FIG. 3 there is a graph 300 illustrating line current during startup operation. Graph 300 includes line 301 representing line current $I_a$ magnitude. Graph 300 includes a maximum current threshold 303. In certain embodiments, maximum current threshold 303 corresponds to a starting locked rotor current maximum defined by NEMA MG-1 standard. In certain embodiments, maximum current threshold is a user-defined value, such as a percentage of a machine current rating. For example, maximum locked rotor current for a 50 HP synchronous machine is 725; however, a user has reduced maximum current threshold 303 to 330 A.

At time $t_{VMAX1}$, voltage across winding 113 reaches a maximum value for the wye configuration and line current $I_a$ begins to decline. Graph 300 also includes a delta current threshold 305 being two-thirds of current threshold 303. Delta current threshold 305 corresponds to an operating condition of system 100 where more torque is derived from the stator phase windings being arranged in the delta configuration rather than the wye configuration. In other embodiments, delta current threshold 305 is another percentage of current threshold 303. As machine 110 approaches synchronous speed, line current begins to decline sharply. At time $t_1$, controller 129 arranges the stator phase windings of machine 110 in a delta configuration in response to a machine current such as line current $I_a$ being equal to or less than threshold 305. Changing from wye configuration to delta configuration at a speed close to synchronous speed allows synchronous machine to exert additional torque necessary for reaching synchronous speed. In certain embodiments, threshold 305 is determined so as to maintain a constant angular acceleration, illustrated by the slope of line 701 in FIG. 7.

At time $t_2$, controller 129 arranges the stator phase windings of synchronous machine 110 in a wye configuration in response to a machine current such as phase current $I_a$ being equal to or less than a steady state current threshold 307.

During operation of machine 110, controller 129 does not allow line current $I_a$ to exceed threshold current 303. As discussed in more detail below, controller 129 maintains the line current at or below maximum current threshold 303 by toggling the switches of motor starter 120 during startup operation.

Figure 4:
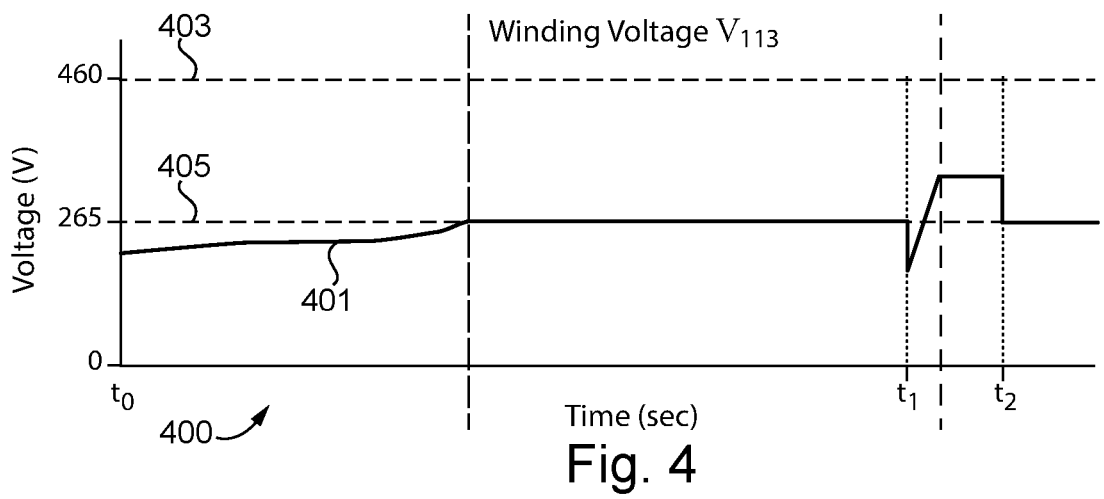

With reference to FIG. 4 there is a graph 400 illustrating winding voltage magnitude $V_{113}$. Graph 400 includes a line 403 representing the maximum voltage of the AC power received from AC power source 101 across winding 113 while the stator windings of machine 110 are coupled in a delta configuration. Graph 400 also includes a line 405 representing the maximum voltage of the AC power received from AC power source 101 across winding while the stator windings of machine 110 are coupled in a wye configuration. In the illustrated embodiment, the magnitude of line 405 is equal to the magnitude of line 403 divided by the square root of three. Beginning at time $t_0$, line 401 representing winding voltage $V_{113}$ approaches line 405. At time $t_{VMAX1}$, line 401 reaches a maximum value until time $t_1$. At time $t_1$, line 401 increases above line 405 until time $t_{VMAX2}$, where winding voltage $V_{113}$ reaches a magnitude between lines 403 and 405. The magnitude of the winding voltage reached at time $t_{VMAX2}$ may be defined as a percentage above line 405. In certain embodiments, the magnitude of winding voltage $V_{113}$ reached at time $t_{VMAX2}$ is 5% above the magnitude of line 405. At time $t_2$, machine enters steady state operation and the stator phase windings are arranged in the wye configuration, causing voltage $V_{113}$ to maximum wye configuration voltage.

Figure 5:
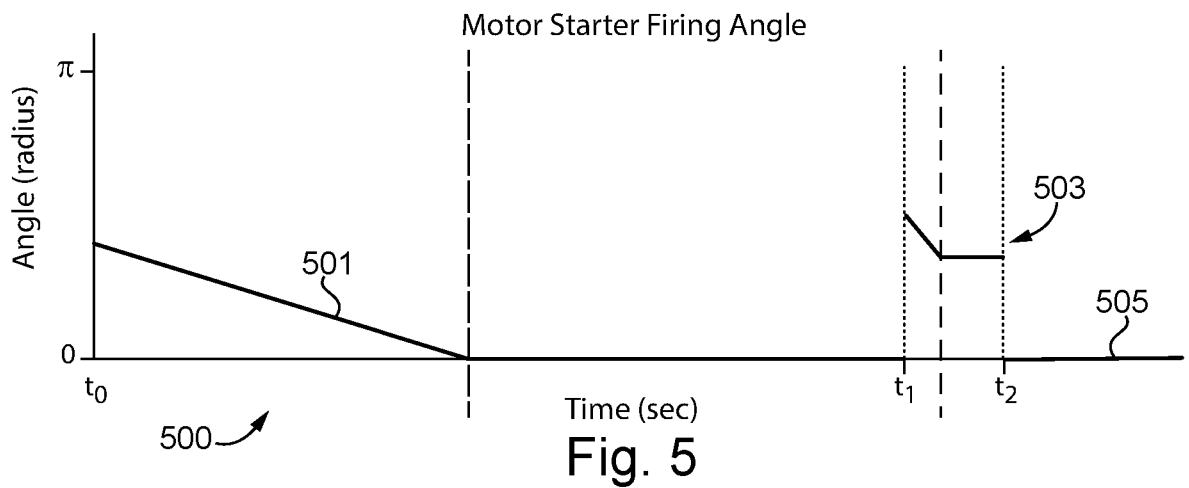

With reference to FIG. 5 there is illustrated a graph 500 representing firing angles of the semiconductor switches of motor starter 120. Graph 500 includes a line 501 representing the firing angle of the control signal transmitted to the plurality of wye semiconductor switches 122 while controller 129 operates the switches of motor starter 120 in a wye configuration. It is important to note the plurality of delta switches 121 are open between $t_0$ and $t_1$, and therefore do not receive a control signal effective to toggle the switches.

Graph 500 includes a line 503 representing the firing angle of the control signal transmitted to the plurality of delta semiconductor switches 121 while controller 129 operates the switches of starter 120 in a delta configuration. It is important to note the plurality of wye semiconductor switches 122 are open between $t_1$ and $t_2$, and therefore do not receive a control signal effective to toggle the switches.

Graph 500 includes a line 505 representing the firing angle of the control signal transmitted to the plurality of wye semiconductor switches 122 while controller 129 operates the switches of motor starter 120 in steady state operation. It is important to note the plurality of delta switches 121 are open after $t_2$ and the plurality of wye semiconductor switches 122 are closed with a zero-degree firing angle to supply motor with undistorted line voltage during steady state operation. In other embodiments, both the plurality of wye semiconductor switches 122 and the plurality of delta switches 121 are open and bypass circuit switches are closed, arranging the stator phase windings in a wye configuration.

Figure 6:
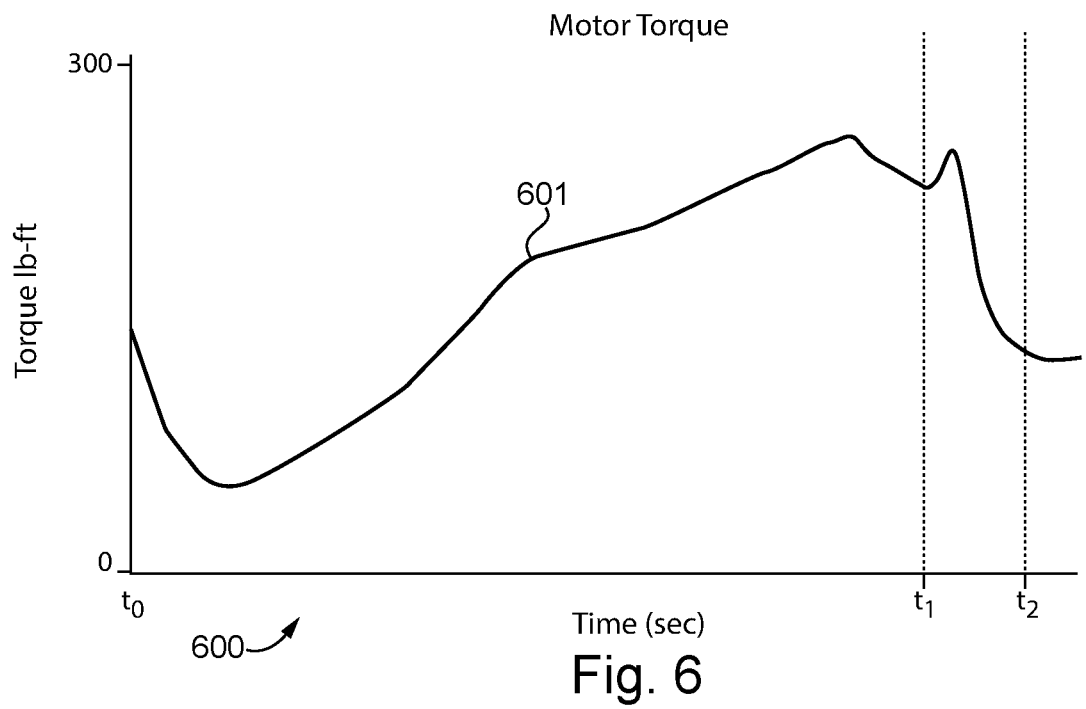

With reference to FIG. 6 there is a graph 600 illustrating output torque of synchronous machine 110. Graph 600 includes a line 601 representing torque produced by synchronous machine 110. As illustrated by line 601, torque increases in response to controller 129 transitioning the switches of motor starter 120 from wye configuration to delta configuration. This provided increase in torque is necessary for certain synchronous machines to reach synchronous speed with a high rotary inertia load.

Figure 7:
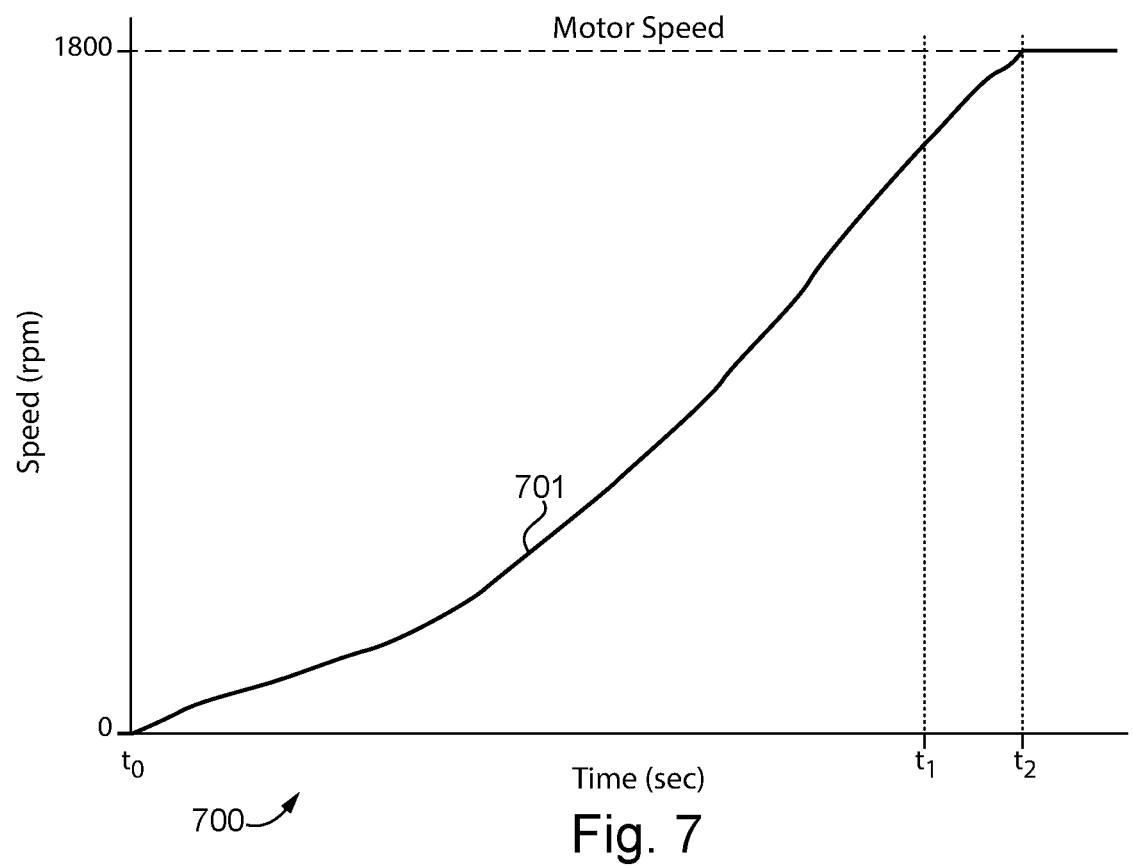

With reference to FIG. 7 there is a graph 700 illustrating angular rotor speed of synchronous machine 110. Graph 700 includes a line 701 representing angular speed during startup operation and steady state operation. Graph 700 also includes a line at 1800 rpm representing synchronous speed. It is important to note at time $t_1$, where output torque is decreasing, machine 110 has not yet reached synchronous speed. Synchronous machine 110 is only able to achieve synchronous speed with a high inertia load when motor starter 120 arranges the stator phase windings in a delta configuration and applies a voltage to the stator phase windings greater than the maximum magnitude of winding voltage achievable while arrange in a wye configuration.

Figure 8A:
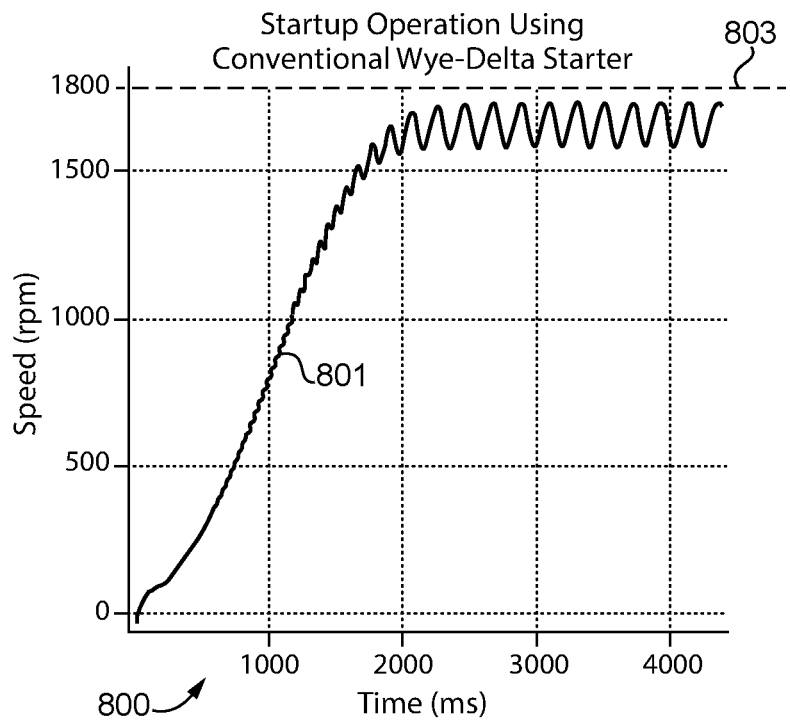
FIGS. 8A-8B are graphs comparing operation of a conventional motor starter and an exemplary motor starter.
Figure 8B:
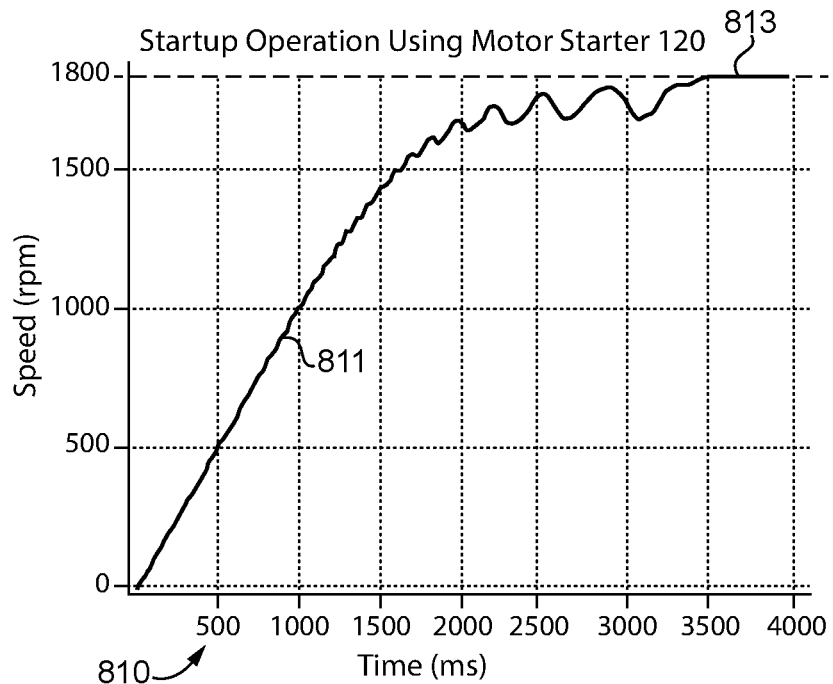

With reference to FIGS. 8A-8B there is illustrated operation of a conventional direct-on-line motor starter and an exemplary direct-on-line motor starter coupled to a 20 HP caged rotor permanent magnet synchronous motor with a load having a high rotary inertia. Both motor starters receive AC power having a line-to-line voltage of 460 V. Synchronous speed for the synchronous motor is 1800 rpm.

With reference to FIG. 8B there is a graph 810 illustrating a startup operation for the motor coupled to a fan having a rotary inertia of 71 lb-ft$^2$, a rotary inertia 4.4 times the rotary inertia of the fan coupled to the motor with the conventional motor starter in FIG. 8A. During startup operation, the stator phase windings of the motor are arranged in a delta configuration. Graph 810 includes a line 811 representing angular speed. At time 0, motor starter 120 begins to apply a voltage of 358 V across each stator phase winding, a magnitude 35% greater than the maximum winding voltage while the stator phase windings are arranged in a wye configuration. As the exemplary motor starter 120 begins to operate synchronous machine 110, angular speed increases until angular speed reaches synchronous speed 813 at 3500 ms. Since the exemplary motor starter is able to couple the stator phase windings in a delta configuration while applying a voltage greater than the maximum voltage achievable while coupled in a wye configuration, the motor starter is structured to provide sufficient torque for the synchronous machine to reach synchronous speed 813.

Further written description of a number of exemplary embodiments shall now be provided. One embodiment is a synchronous machine comprising: a plurality of stator phase windings; a rotor; a motor starter including: a plurality of wye semiconductor switches each coupled between a common node and a respective one of the plurality of stator phase windings of the plurality of stator phase windings, and a plurality of delta semiconductor switches each coupled between a respective pair of two stator phase windings of the plurality of stator phase windings; and a controller structured to operate the plurality of wye semiconductor switches and the plurality of delta semiconductor switches so as to couple the plurality of stator phase windings in a delta configuration while an angular speed of the rotor is less than a synchronous speed, and structured to operate the plurality of wye semiconductor switches and the plurality of delta semiconductor switches so as to couple the plurality of stator phase windings in a wye configuration in response to the angular speed of the rotor being equal to the synchronous speed.

In certain forms of the foregoing synchronous machine, the rotor includes a squirrel cage and a plurality of permanent magnets, and wherein the rotor is coupled to a fan. In certain forms, the plurality of stator phase windings is structured to be coupled to an AC power source, the AC power source being structured to output three-phase power having a first line-to-line voltage magnitude, wherein, while the plurality of stator phase windings is coupled in a delta configuration, a winding voltage magnitude across each of the plurality of stator phase windings is greater than a value equal to the first line-to-line voltage magnitude divided by the square root of three. In certain forms, while the plurality of stator phase windings is coupled in a delta configuration, each switch of the plurality of delta semiconductor switches is toggled effective to reduce an inrush current below a maximum current threshold. In certain forms, the plurality of wye semiconductor switches includes three bidirectional triode thyristors (TRIACs) and the plurality of delta semiconductor switches includes three TRIACs, and wherein the controller is structured to toggle the plurality of delta semiconductor switches by adjusting a firing angle of the three thyristors of the plurality of delta semiconductor switches. In certain forms, the controller is structured to start the synchronous machine by arranging the plurality of stator phase windings in the wye configuration using the plurality of wye semiconductor switches and the plurality of delta semiconductor switches, determining a motor phase current is less than a delta current threshold, and then arranging the plurality of stator phase windings in the delta configuration using the plurality of wye semiconductor switches and the plurality of delta semiconductor switches until the angular speed of the rotor is equal to the synchronous speed. In certain forms, while the rotor is rotating at less than synchronous speed and the stator phase windings are coupled in the wye configuration, the controller is structured to toggle the plurality of wye semiconductor switches effective to reduce an inrush current below a maximum current threshold. In certain forms, the motor starter comprises a bypass circuit including a plurality of bypass switches each coupled between a second common node and a respective one of the plurality of stator phase windings, and wherein the controller couples the plurality of stator phase windings in a wye configuration in response to the angular speed of the rotor being equal to the synchronous speed by opening the plurality of wye semiconductor switches and the plurality of delta semiconductor switches and closing the plurality of bypass switches.

Another exemplary embodiment is a motor starter for a synchronous machine including a rotor and a plurality of stator phase windings comprising: a plurality of wye configuration switches each coupled to a common node and structured to be coupled to a stator phase winding of the plurality of stator phase windings; a plurality of delta configuration switches each structured to be coupled to two stator phase windings of the plurality of stator phase windings; and a controller structured to operate the synchronous machine in a startup mode and a steady state mode, wherein the startup mode includes opening each switch of the plurality of wye configuration switches and toggling each switch of the plurality of delta configuration switches effective to provide a modified AC power to the plurality of stator phase windings, wherein the steady state mode includes opening the plurality of delta configuration switches, and wherein the controller transitions from startup mode to steady state mode in response to determining the rotor is rotating at a synchronous speed.

In certain forms of the foregoing motor starter, the motor starter receives an unmodified AC power from an AC power source including a first line-to-line voltage, and the modified AC power includes a voltage across each stator phase winding of the plurality of stator phase windings greater than a value equal to the first line-to-line voltage divided by the square root of three. In certain forms, the motor starter is structured to toggle the delta configuration switches effective to reduce an inrush current to below a maximum current threshold. In certain forms, startup mode includes toggling the plurality of wye configuration switches and opening the plurality of delta configuration switches until a motor current falls below a delta current threshold, and then opening each switch of the plurality of wye configuration switches and toggling each switch of the plurality of delta configuration switches in response to the motor current falling below the delta current threshold. In certain forms, toggling the plurality of wye configuration switches during startup mode is effective to maintain a motor current below a maximum current threshold. In certain forms, toggling the plurality of wye configuration switches includes adjusting a first firing angle and toggling the delta configuration switches includes adjusting a second firing angle.

A further exemplary embodiment is a method for starting a synchronous machine coupled to a high inertia load comprising: operating a motor starter including a plurality of wye semiconductor switches each coupled between a common node and one stator phase winding of a plurality of stator phase windings, and a plurality of delta semiconductor switches each coupled between two stator phase windings of the plurality of stator phase windings; arranging the plurality of stator phase windings in a delta configuration using the motor starter; receiving an unmodified AC power from a power source including a first line-to-line voltage; providing a modified AC power to the plurality of stator phase windings using the motor starter, the modified AC power including a winding voltage across each of the plurality of stator phase windings greater than a value equal to the first line-to-line voltage divided by the square root of three; determining an angular speed of a rotor of the synchronous machine is equal to a synchronous speed; and arranging the plurality of stator phase windings in a wye configuration using the motor starter in response to determining the angular speed of the rotor is equal to the synchronous speed.

In certain forms of the foregoing method, the high inertia load is a fan and the rotor includes a plurality of permanent magnets. In certain forms, the unmodified AC power includes a first phase and a second phase, and the first line-to-line voltage is the voltage across the first phase and the second phase. In certain forms, arranging the plurality of stator phase windings in a delta configuration includes opening the plurality of wye semiconductor switches and toggling the plurality of delta semiconductor switches effective to reduce an inrush current below a maximum current threshold. In certain forms, the method comprises arranging the plurality of stator phase windings in a startup wye configuration; determining a current is below a delta current threshold, wherein arranging the plurality of stator phase windings in the delta configuration is performed in response to determining the current is below the delta current threshold, and wherein arranging the plurality of stator phase windings in the startup wye configuration includes opening the delta semiconductor switches and toggling the wye semiconductor switches. In certain forms, toggling the plurality of wye semiconductor switches and the plurality of delta semiconductor switches includes opening and closing each switch during zero-current conditions. In certain forms, the motor starter comprises a bypass circuit including a plurality of bypass switches, and wherein arranging the plurality of stator phase windings in a wye configuration using the motor starter includes opening the plurality of wye semiconductor switches, opening the plurality of delta semiconductor switches, and closing the plurality of bypass switches.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A synchronous machine comprising:
    a plurality of stator phase windings;
    a rotor;
    a motor starter including:
        a plurality of wye semiconductor switches each coupled between a common node and a respective one of the plurality of stator phase windings of the plurality of stator phase windings, and
        a plurality of delta semiconductor switches each coupled between a respective pair of two stator phase windings of the plurality of stator phase windings; and
    a controller structured to operate the plurality of wye semiconductor switches and the plurality of delta semiconductor switches so as to couple the plurality of stator phase windings in a delta configuration while an angular speed of the rotor is less than a synchronous speed, and structured to operate the plurality of wye semiconductor switches and the plurality of delta semiconductor switches so as to couple the plurality of stator phase windings in a wye configuration in response to the angular speed of the rotor being equal to the synchronous speed.

2. The synchronous machine of claim 1 wherein the rotor includes a squirrel cage and a plurality of permanent magnets, and wherein the rotor is coupled to a fan.

3. The synchronous machine of claim 1 wherein the plurality of stator phase windings is structured to be coupled to an AC power source, the AC power source being structured to output three-phase power having a first line-to-line voltage magnitude, wherein, while the plurality of stator phase windings is coupled in a delta configuration, a winding voltage magnitude across each of the plurality of stator phase windings is greater than a value equal to the first line-to-line voltage magnitude divided by the square root of three.

4. The synchronous machine of claim 3 wherein while the plurality of stator phase windings is coupled in a delta configuration, each switch of the plurality of delta semiconductor switches is toggled effective to reduce an inrush current below a maximum current threshold.

5. The synchronous machine of claim 4 wherein the plurality of wye semiconductor switches includes three bidirectional triode thyristors (TRIAC) and the plurality of delta semiconductor switches includes three TRIACs, and wherein the controller is structured to toggle the plurality of delta semiconductor switches by adjusting a firing angle of the three thyristors of the plurality of delta semiconductor switches.

6. The synchronous machine of claim 1 wherein the controller is structured to start the synchronous machine by arranging the plurality of stator phase windings in the wye configuration using the plurality of wye semiconductor switches and the plurality of delta semiconductor switches, determining a motor phase current is less than a delta current threshold, and then arranging the plurality of stator phase windings in the delta configuration using the plurality of wye semiconductor switches and the plurality of delta semiconductor switches until the angular speed of the rotor is equal to the synchronous speed.

7. The synchronous machine of claim 6 wherein, while the rotor is rotating at less than synchronous speed and the stator phase windings are coupled in the wye configuration, the controller is structured to toggle the plurality of wye semiconductor switches effective to reduce an inrush current below a maximum current threshold.

8. The synchronous machine of claim 1 wherein the motor starter comprises a bypass circuit including a plurality of bypass switches each coupled between a second common node and a respective one of the plurality of stator phase windings, and wherein the controller couples the plurality of stator phase windings in a wye configuration in response to the angular speed of the rotor being equal to the synchronous speed by opening the plurality of wye semiconductor switches and the plurality of delta semiconductor switches and closing the plurality of bypass switches.

9. A motor starter for a synchronous machine including a rotor and a plurality of stator phase windings comprising:
    a plurality of wye configuration switches each coupled to a common node and structured to be coupled to a stator phase winding of the plurality of stator phase windings;
    a plurality of delta configuration switches each structured to be coupled to two stator phase windings of the plurality of stator phase windings; and
    a controller structured to operate the synchronous machine in a startup mode and a steady state mode, wherein the startup mode includes opening each switch of the plurality of wye configuration switches and toggling each switch of the plurality of delta configuration switches effective to provide a modified AC power to the plurality of stator phase windings, wherein the steady state mode includes opening the plurality of delta configuration switches, and wherein the controller transitions from startup mode to steady state mode in response to determining the rotor is rotating at a synchronous speed.

10. The motor starter of claim 9 wherein the motor starter receives an unmodified AC power from an AC power source including a first line-to-line voltage, and the modified AC power includes a voltage across each stator phase winding of the plurality of stator phase windings greater than a value equal to the first line-to-line voltage divided by the square root of three.

11. The motor starter of claim 9 wherein the motor starter is structured to toggle the delta configuration switches effective to reduce an inrush current to below a maximum current threshold.

12. The motor starter of claim 11 wherein the startup mode includes toggling the plurality of wye configuration switches and opening the plurality of delta configuration switches until a motor current falls below a delta current threshold, and then opening each switch of the plurality of wye configuration switches and toggling each switch of the plurality of delta configuration switches in response to the motor current falling below the delta current threshold.

13. The motor starter of claim 12 wherein toggling the plurality of wye configuration switches during startup mode is effective to maintain a motor current below a maximum current threshold.

14. The motor starter of claim 13 wherein toggling the plurality of wye configuration switches includes adjusting a first firing angle and toggling the delta configuration switches includes adjusting a second firing angle.

15. A method for starting a synchronous machine coupled to a high inertia load comprising:
    operating a motor starter including a plurality of wye semiconductor switches each coupled between a common node and one stator phase winding of a plurality of stator phase windings, and a plurality of delta semiconductor switches each coupled between two stator phase windings of the plurality of stator phase windings;

arranging the plurality of stator phase windings in a delta configuration using the motor starter;

receiving an unmodified AC power from a power source including a first line-to-line voltage;

providing a modified AC power to the plurality of stator phase windings using the motor starter, the modified AC power including a winding voltage across each of the plurality of stator phase windings greater than a value equal to the first line-to-line voltage divided by the square root of three;

determining an angular speed of a rotor of the synchronous machine is equal to a synchronous speed; and arranging the plurality of stator phase windings in a wye configuration using the motor starter in response to determining the angular speed of the rotor is equal to the synchronous speed.

16. The method of claim 15, wherein the high inertia load is a fan and the rotor includes a plurality of permanent magnets.

17. The method of claim 15 wherein the unmodified AC power includes a first phase and a second phase, and the first line-to-line voltage is the voltage across the first phase and the second phase.

18. The method of claim 15 wherein arranging the plurality of stator phase windings in a delta configuration includes opening the plurality of wye semiconductor switches and toggling the plurality of delta semiconductor switches effective to reduce an inrush current below a maximum current threshold.

19. The method of claim 18 comprising arranging the plurality of stator phase windings in a startup wye configuration; determining a current is below a delta current threshold, wherein arranging the plurality of stator phase windings in the delta configuration is performed in response to determining the current is below the delta current threshold, and wherein arranging the plurality of stator phase windings in the startup wye configuration includes opening the delta semiconductor switches and toggling the wye semiconductor switches.

20. The method of claim 19 wherein toggling the plurality of wye semiconductor switches and the plurality of delta semiconductor switches includes opening and closing each switch during zero-current conditions.

21. The method of claim 15 wherein the motor starter comprises a bypass circuit including a plurality of bypass switches, and wherein arranging the plurality of stator phase windings in a wye configuration using the motor starter includes opening the plurality of wye semiconductor switches, opening the plurality of delta semiconductor switches, and closing the plurality of bypass switches.

* * * * *